United States Patent
Ridgeway et al.

(10) Patent No.: US 6,804,347 B2
(45) Date of Patent: Oct. 12, 2004

(54) REPLACING TELECOMMUNICATIONS CARRIER EQUIPMENT

(75) Inventors: William S. Ridgeway, Olympia, WA (US); Jon F. Davison, Olympia, WA (US); David A. Nicholas, Olympia, WA (US)

(73) Assignee: Qwest Communications International Inc., Denver, CO (US)

( * ) Notice: Subject to any disclaimer, the term of this patent is extended or adjusted under 35 U.S.C. 154(b) by 586 days.

(21) Appl. No.: 09/876,347

(22) Filed: Jun. 7, 2001

(65) Prior Publication Data

US 2002/0196930 A1 Dec. 26, 2002

(51) Int. Cl.[7] ................................................ H04M 5/00

(52) U.S. Cl. ........................ 379/322; 379/323; 379/324

(58) Field of Search ................................. 379/307, 310, 379/312, 320, 322, 323, 324, 102.04, 106.04, 318, 413

(56) References Cited

U.S. PATENT DOCUMENTS 5,736,949 A * 4/1998 Ong et al. .................. 341/141
5,898,618 A * 4/1999 Lakkapragada et al. ..................... 365/185.22

* cited by examiner

Primary Examiner—Bing Q. Bui
(74) Attorney, Agent, or Firm—Brooks Kushman P.C.

(57) ABSTRACT

Telecommunications carrier equipment in a field cabinet can be replaced so as to allow existing carrier multiplexers to be powered by newer, smaller power supply equipment. Each carrier multiplexer has a plurality of power connections for each of a plurality of power types. The existing set of power supply equipment has a supply connection corresponding to each power connection at each power types. The power inputs of each power type for each carrier multiplexer are bridged together. A replacement set of power supply equipment has a single supply connection corresponding to each power type for each carrier. Each of the bridged power inputs for each carrier multiplexer is connected with the corresponding supply connection on the replacement set of power supply equipment for each power type.

16 Claims, 4 Drawing Sheets

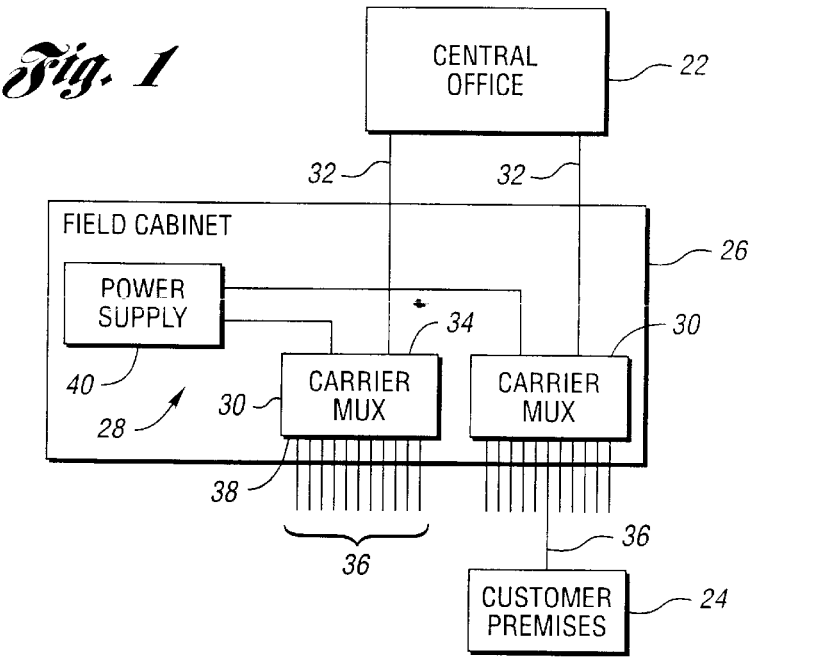
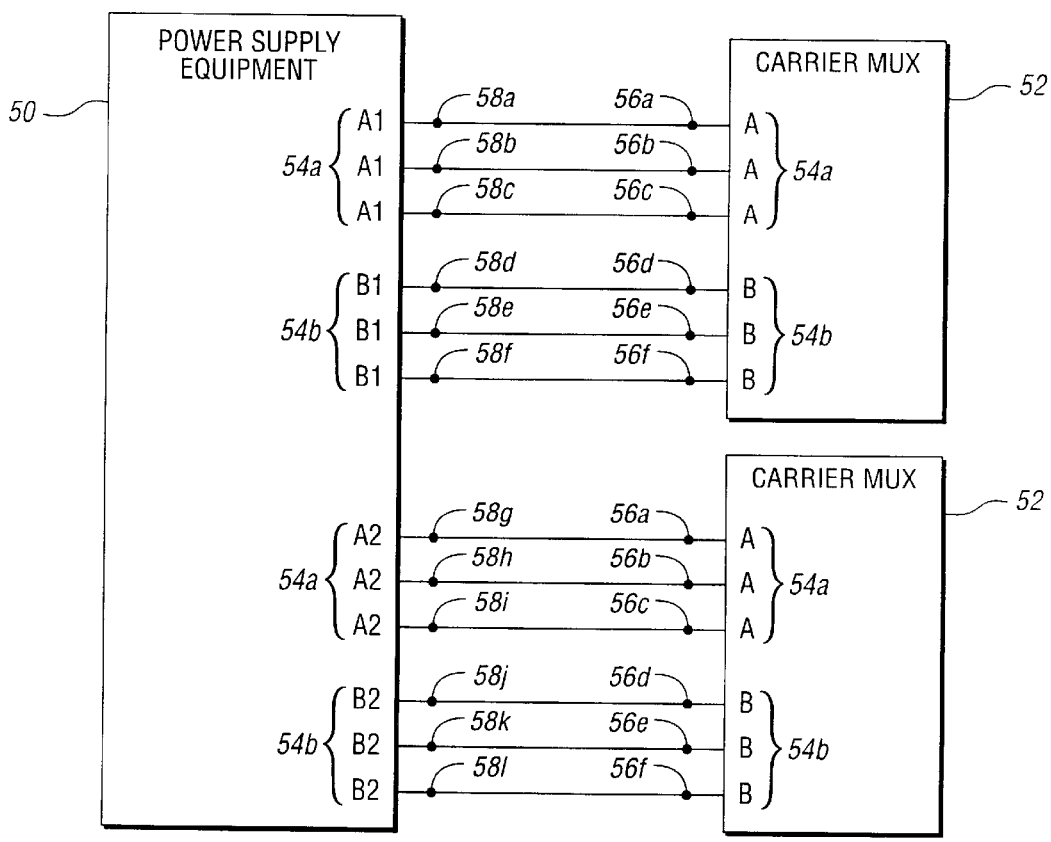

REPLACING TELECOMMUNICATIONS CARRIER EQUIPMENT

BACKGROUND OF THE INVENTION

1. Field of the Invention

This invention relates to servicing telecommunications equipment located in the field.

2. Background Art

Telecommunications systems are typically designed as a collection of distributed central offices interconnected by high speed trunks. Each central office contains switches for routing calls carried over the trunk lines to individual carrier loops running between the central office and subscriber premises.

As the number of customers supported by a central office grows, the capacity to directly connect the central office to each customer can be exceeded. One costly solution is to build more central offices. A less expensive solution is to run a small set of cables from the central office to a field cabinet located close to customer premises. The cables terminate at one or more carrier multiplexers. Each carrier multiplexer supports a plurality of carrier loops. Signals on the carrier loops are multiplexed onto the central office cables. Thus, the central office is capable of supporting a greater number of customers.

A carrier multiplexer which has seen great use in the past is the subscriber loop carrier (SLC) such as, for example, the SLC-96. This device enables up to 96 analog subscriber carrier loops to be served by three central office cables. A typical field cabinet may contain up to five SLC-96 carrier multiplexers. The field cabinet also includes power supply equipment supporting the carrier multiplexers. Typically, up to three carrier multiplexers are supplied by a set of power supply equipment. This equipment includes an AC supply receiving AC current from outside of the cabinet. A rectifier circuit converts line AC to DC, typically −48V, for use by the carrier multiplexers. A ringing voltage circuit converts line AC to ringing AC voltage for driving telephone ringers. A battery back-up system, referred to as a battery tray, provides electrical power in the event of external AC cut-off. Finally, alarm logic monitors conditions within the field cabinet and generates alarms typically received by the central office. Alarms may be based on sensing a variety of conditions including AC supply operation, rectifier operation, ringing voltage operation, battery tray operation, equipment temperature, carrier multiplexer operating status, cabinet door opening, and the like.

The use of carrier multiplexers in remote field cabinets greatly increase the number of subscriber loops which can be supported by a central office. However, once the field cabinet is filled with equipment, and the maximum number of carrier loops supported by this equipment had been dedicated, local capacity is again exhausted. One solution for expansion is to construct another field cabinet to support increasing demand in the area covered by the full field cabinet. However, constructing a new field cabinet is expensive, typically requiring additional easement rights which may not be available as well as the cost of installing another pedestal and AC power feed. Thus, a less expensive alternative is needed.

Improvements in technology permit a greater number of carrier multiplexers to be packed into the same cabinet volume. Similarly, improvements in power supply technology reduce the cabinet volume necessary to support each new carrier multiplexer. However, for cost and functionality reasons, an advantage may be gained by continuing to use existing carrier multiplexers such as the SLC-96.

Thus, a problem arises. Replacing old power supply equipment with newer, smaller power supply equipment creates additional space for more carrier multiplexers. However, output wiring from new power supply equipment is not compatible with older, existing carrier multiplexers. What is needed is to interconnect newer power supply equipment with older carrier multiplexers. This connection scheme should permit a mixture of newer carrier multiplexers and older carrier multiplexers within the same field cabinet. Further, replacing power supply equipment should be done in a manner that disrupts telecommunications services as little as possible.

SUMMARY OF THE INVENTION

The present invention permits replacing telecommunications carrier equipment in a field cabinet so as to allow existing carrier multiplexers to be powered by newer, smaller power supply equipment.

A method of replacing telecommunications carrier equipment in a field cabinet is provided. A first set of power supply equipment supporting at least one carrier multiplexer is removed. Each carrier multiplexer has power connections for each power type. The first set of power supply equipment has a supply connection corresponding to each power connection at each power type. All of the plurality of power inputs of each power type for each carrier multiplexer are bridged together. A second set of power supply equipment has a single supply connection corresponding to each power type for each carrier multiplexer. Each of the bridged power inputs for each carrier multiplexer is connected with the corresponding supply connection for each power type.

In an embodiment of the present invention, a central office is notified of possible power related alarms prior to removing the first set of power supply equipment.

In another embodiment of the present invention, at least one new carrier multiplexer is installed. Each new carrier multiplexer has at least one power input corresponding to each of the power types. For each new carrier multiplexer, the at least one power input for each power type is connected with a corresponding power supply connection on the second set of power supply equipment. At least one high-bandwidth cable is connected to the central office side of each new carrier multiplexer. A plurality of carrier loops are connected to the customer premises side of each new carrier multiplexer. The new carrier multiplexer may be a digital carrier system such as, for example, an NEC-ISC-303.

In still another embodiment of the present invention, the second set of power supply equipment comprises a Lucent CPS-4000.

In yet another embodiment of the present invention, at least one carrier multiplexer is an SLC-96.

In a further embodiment of the present invention, the plurality of power types includes −48 VDC and ground return. The plurality of power types may also include positive ringing AC and negative ringing AC.

A remote terminal cabinet is also provided. The cabinet includes a housing located outside of a telecommunications central office. Equipment in the housing is connected to the central office through high-bandwidth cables. Equipment in the housing is connected to customer premises through carrier loops. Carrier multiplexers are disposed within the housing. Each carrier multiplexer multiplexes at least one of the high bandwidth cables to customer premises carrier loops. At least one of the carrier multiplexers has power connections for each power type. A power supply is also disposed within the housing. The power supply has a power supply connection for each power type on each carrier multiplexer. A bridging connection connects power connections for one power type on a carrier multiplexer with a corresponding power supply connection on the power supply.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a block diagram illustrating carrier multiplexing between a central office and customer premises that may incorporate the present invention;

FIG. 2 is a block diagram of a system for supplying power according to the prior art, wherein the power supply has a plurality of connections for each of a plurality of power types on each carrier multiplexer;

DETAILED DESCRIPTION OF THE PREFERRED EMBODIMENT

Figure 3:
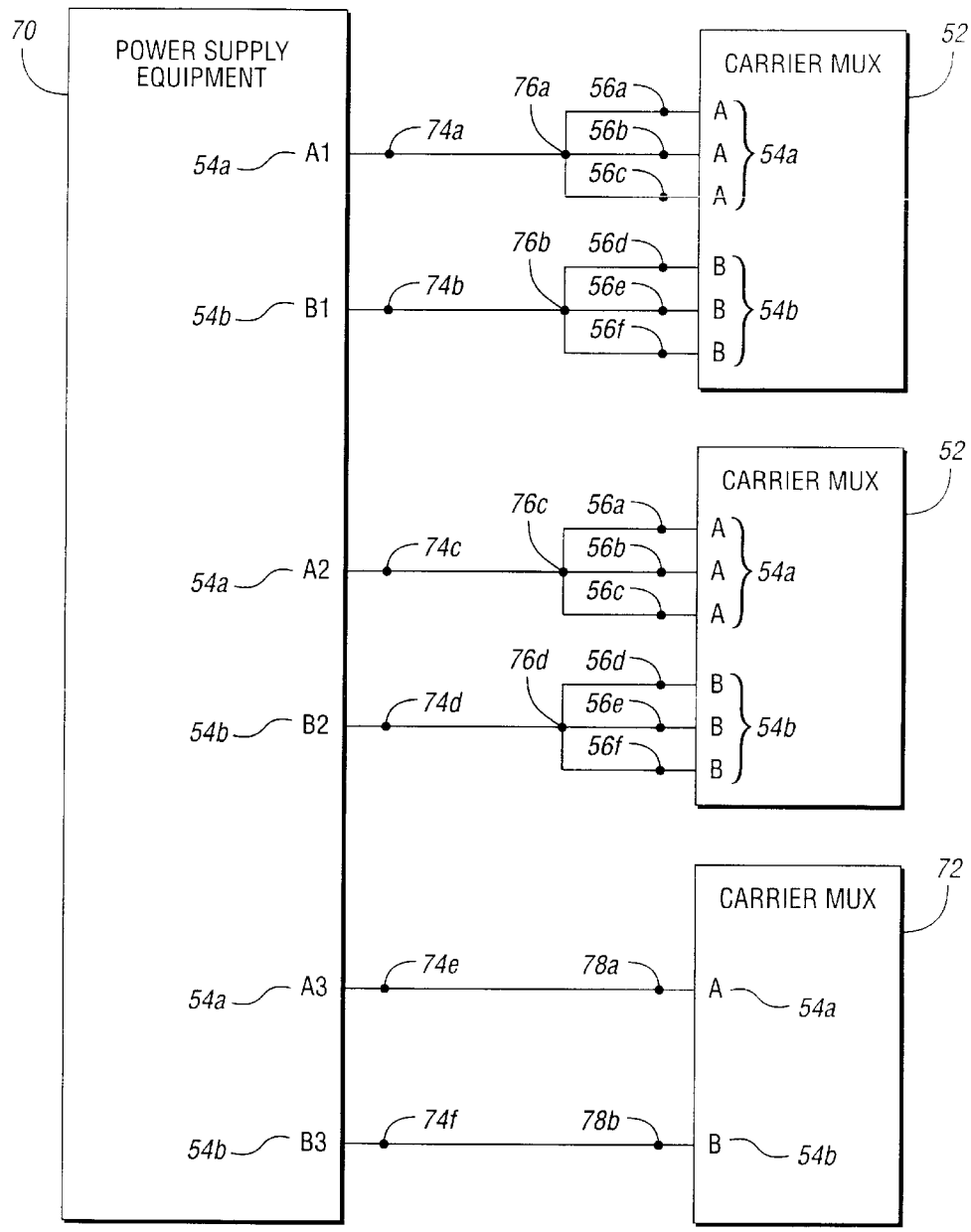
FIG. 3 is a block diagram of a system for supplying power to carrier multiplexers according to an embodiment of the present invention.

With reference to FIG. 1 of the drawings, a block diagram illustrating carrier multiplexing between a central office and customer premises is shown. A telecommunications system, shown generally by 20, includes central office 22 serving a plurality of customer premises, one of which is indicated by 24. Telecommunications system 20 may include one or more field cabinets 26 containing telecommunications carrier equipment, shown generally by 28. Equipment 28 includes one or more carrier multiplexers 30. Each carrier multiplexer 30 accepts high bandwidth cables 32, typically three or five T-1 cables, from central office 22 at central office side 34 of carrier multiplexer 30. Cables 32 may utilize various transmission media including twisted pair conductors, fiber optic cables, and the like. Carrier multiplexer 34 accepts a plurality of carrier loops 36 from customer premises 24 at customer premises side 38 of carrier multiplexer 30. Each carrier loop 36 may support voice and data transmissions between customer premises 24 and carrier multiplexer 30. Carrier multiplexer 30 multiplexes carrier loops 36 onto cables 32 using various techniques such as, for example, time division multiplexing. A variety of carrier multiplexer types are available including traditional analog multiplexers such as the SLC-96, digital carrier systems such as the ISC-303 from NEC Eluminant Technologies, Inc. of Herndon, Va., and the like.

Field cabinet telecommunications carrier equipment 28 also includes power supply equipment 40 providing power to carrier multiplexers 30. Power supply equipment 40 may include an AC supply accepting line voltage from outside of the field cabinet, one or more rectifiers for converting line voltage to DC, ringing voltage converters for converting line AC to ringing voltage AC, battery trays providing power back-up in case of AC failure, alarm logic for monitoring the status of field cabinet 26, and the like.

Referring now to FIG. 2, a block diagram of a system for supplying power according to the prior art is shown. Typical old-style power supply equipment 50 utilizes ferroresonant technology which requires a relatively large amount of space within field cabinet 26. Each set of power supply equipment 50 supports two to three old-style carrier multiplexers 52, such as SLC-96 systems. Each carrier multiplexer 52 requires a plurality of power types 54. In FIG. 2, two power types 54 are illustrated. Power type A, indicated by reference 54a, might be, for example, −48 VDC. Power type B, indicated by reference 54b, might be, for example, the return ground for the −48 VDC supply. Each carrier multiplexer 52 has a plurality of power connections 56 for each power type 54. In FIG. 2, power type 54a has connectors 56a, 56b, 56c and power type 54b has power connections 56d, 56e, 56f.

Power supply equipment 50 has supply connections 58 corresponding to power connections 56 on each carrier multiplexer 52 supported by power supply equipment 50. Thus, power supply equipment 50 has supply connection 58 for each power connection 56 of each power type 54 for each carrier multiplexer 52. In FIG. 2, power supply equipment 50 has supply connection 58a, 58b, 58c of power type 54a and supply connection 58d, 58e, 58f of type 54b. Each supply connection 58a—58f connects with corresponding power connection 56a–56f of a first carrier multiplexer 52. Power supply equipment 50 also has supply connection 58g, 58h, 58i of power type 54a and supply connection 58j, 58k, 58l of power type 54b. Supply connections 58g–58l connect with corresponding power connections 56a–56f of a second carrier multiplexer 52.

Referring now to FIG. 3, a block diagram of a system for supplying power to carrier multiplexers according to an embodiment of the present invention is shown. Old-style power supply equipment 50 has been replaced with power supply equipment 70 constructed using microelectronic technology. Power supply equipment 70 thus requires less space within field cabinet 26, allowing more space for additional carrier multiplexer 72. In addition to being smaller, power supply equipment 70 is more efficient, generates less heat, and requires only one supply connection 74 for each power type 54 on each carrier multiplexer 52,72.

In order to connect carrier multiplexers 52 to power supply 70, power connections 56 for each power type 54 on each carrier multiplexer 52 must be joined in bridge 76. In FIG. 3, bridge 76a connects power connections 56a, 56b, 56c of power type 54a on first carrier multiplexer 52. Bridge 76b connects power connections 56d, 56e, 56f of power type 54b on first carrier multiplexer 52. Bridge 76c connects power connections 56a, 56b, 56c of power type 54a on second carrier multiplexer 52. Bridge 76d connects power connections 56d, 56e, 56f of power type 54b on second carrier multiplexer 52. Bridge 76a connects to supply connection 74a, bridge 76b connects to supply connection 74b, bridge 76c connects to power connection 74c, and bridge 76d connects to supply connection 74d on power supply equipment 70.

Typically, new carrier multiplexer 72 has one power connection 78 for each power type 54. Thus, for power type 54a, power connection 78a directly connects to supply connection 74e. Also, for power type 54b, power connection 78b connects directly supply connection 74f of power supply equipment 70.

Figure 4:
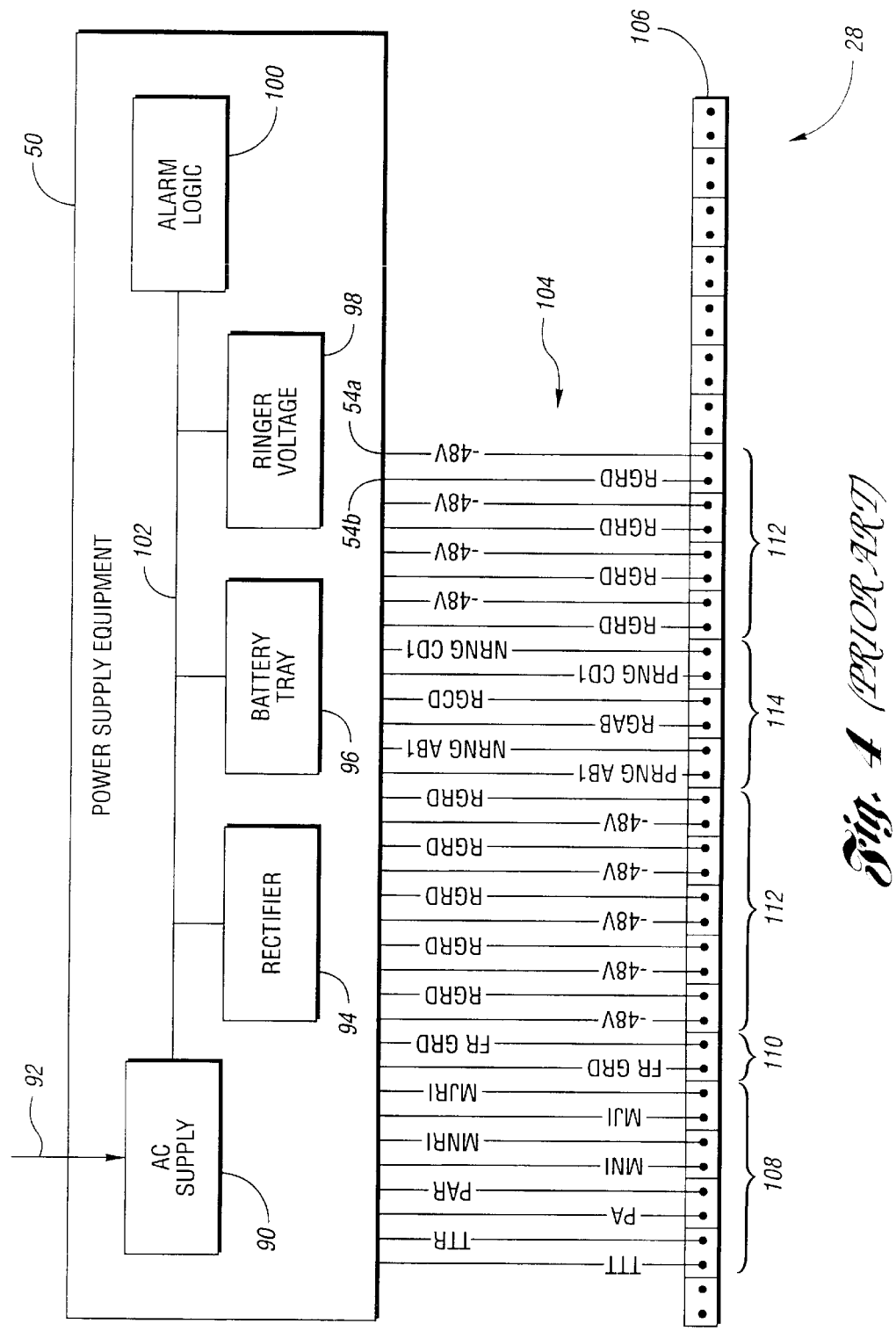
FIG. 4 is a schematic diagram of a power connection block from power supply equipment supporting a plurality of power supply connections for each of a plurality of power types.

Referring now to FIG. 4, a schematic diagram of a power connection block from power supply equipment supporting a plurality of power supply connections for each of a plurality of power types is shown. Old-style power supply equipment 50 typically includes an interconnected collection of discrete equipment. AC supply 90 conditions power received from AC power input 92 for use by other power supply equipment 50. AC supply 90 may include transformers, diodes, capacitors, and the like to condition line voltage and protect power supply equipment 50 from damage due to power surges and spikes.

Rectifier 94 accepts AC line voltage from AC supply 90 and produces DC voltage for use by carrier multiplexers 52. Typically, this DC voltage includes −48 VDC and a return ground. However additional voltage levels such as, for example, −24 VDC and ground, are within the spirit and scope of the present invention.

Battery tray 96 supports a plurality of batteries which are charged with energy received from AC power input 92 and return this energy to power supply equipment 50 if AC power input 92 ceases to be received.

Ringing voltage 98 converts line voltage from AC supply 90 into an AC ringing voltage for use by carrier multiplexers 52. Ringing voltages vary, but a typical ringing voltage is 105 VAC at 20 Hz.

Alarm logic 100 monitors various functions within filed cabinet 26 including power supply equipment 50 and carrier multiplexers 52. When a measured parameter is outside of predetermined tolerances, an alarm signal is generated. This alarm signal is typically transmitted to central office 22.

Various components within power supply equipment 50 are interconnected with power equipment cabling 102. Components 90, 94, 96, 98, 100 and their interconnection 102 vary between applications as is well known in the telecommunications art.

Power and signal wires are connected to power supply equipment 50 through one or more power harnesses, shown generally by 104. Connections between wires in harnesses 104 and power components 94, 98, 100 have been omitted for clarity. Such connections vary between applications as is known in the art. Values for individual wires in harness 104 are shown abbreviated in FIG. 4. Abbreviations and corresponding descriptions are summarized in Table 1.

TABLE 1

| Abbreviation | Description |
| --- | --- |
| TRAJECTORY | DC Test Pair TIP |
| TTR | DC Test Pair RING |
| PA | Power Alarm |
| PAR | Power Alarm Return |
| MN1 | Minor Alarm |
| MNR1 | Minor Alarm Return |
| MJ1 | Major Alarm |
| MJR1 | Major Alarm Return |
| FR GRD | Frame Ground |
| −48 V | −48 VDC |
| RGRD | Return Ground |
| PRNG | Positive Ringing AC |
| NRNG | Negative Ringing AC |

Harness 104 terminates in 50-pin 710 module 106. Module 106 has twenty-five connection pairs numbered 1–25 left-to-right as shown in FIG. 4. As shown in FIG. 4, the left connector of each pair corresponds with the (1) conductor, also known as the TIP side of a pair. The right connector of each pair is the (2) conductor, also known at the RING side of a pair. Typically, 710 module 106 is a female module.

Each carrier multiplexer 52 is connected to a male 710 module, not shown for clarity, with necessary like wiring. When the male and female 710 modules are mated, there is continuity between power supply equipment 50 and carrier multiplexer 52.

In the example shown in FIG. 4, thirty-four pairs of solid 22-gauge wire interconnect power supply equipment 50 with module 106. Pair sets two through five, indicated by 108, carry alarm signals. Pair set six, indicated by 110, carry the frame ground. Pair sets numbered seven through eleven and fifteen through eighteen, indicated by 112, are nine pairs of DC voltage and ground connections. Typically, each voltage wire is separately fused within rectifier 94. Pairs numbered twelve through fourteen, indicated by 114, supply ringing voltages.

Figure 5:
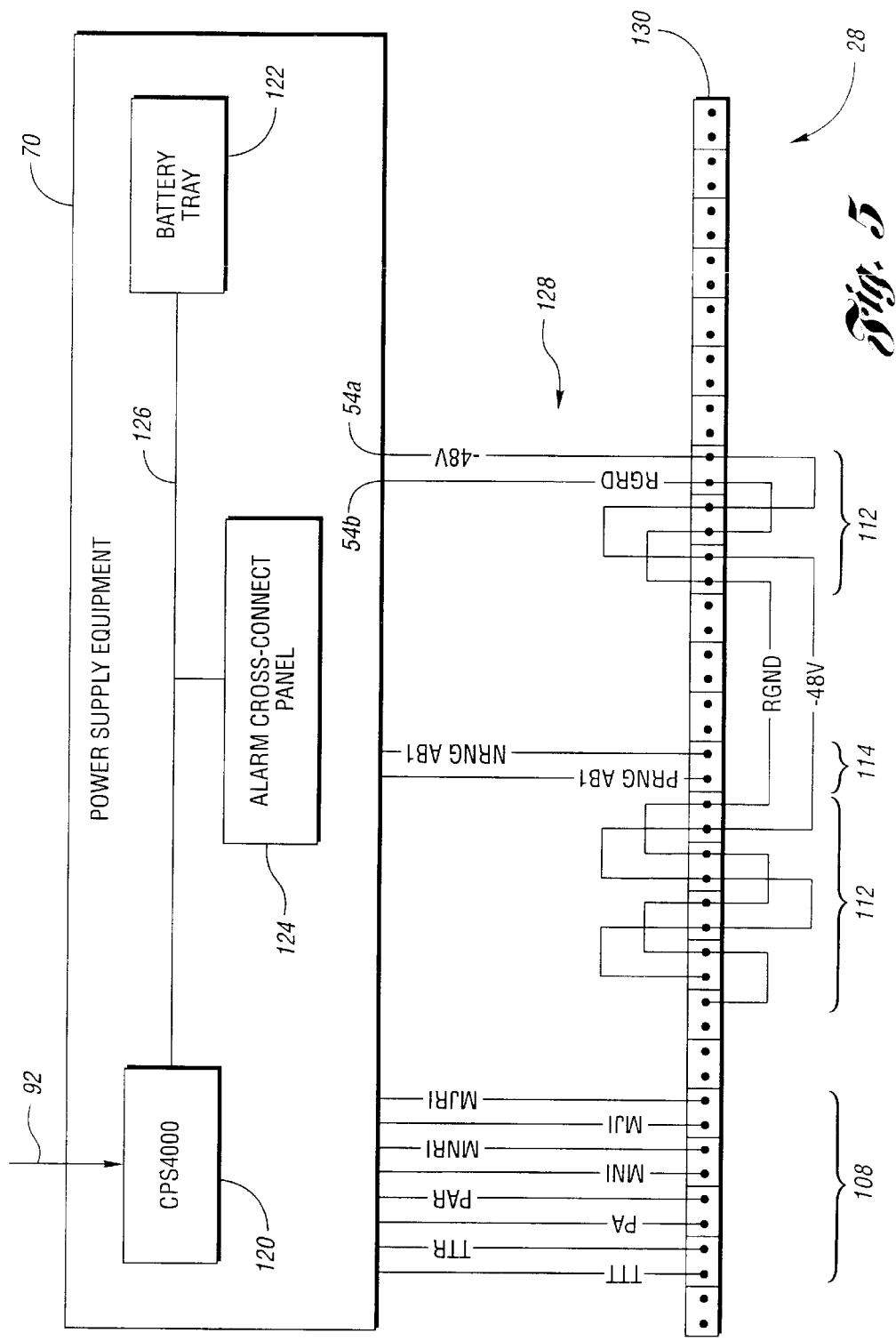
FIG. 5 is a schematic diagram of a power connection block from power supply equipment according to an embodiment of the present invention.

Referring now to FIG. 5, a schematic diagram of a power connection block from power supply equipment according to an embodiment of the present invention is shown. Power supply equipment 70 requires less volume within field cabinet 26 than older power supply equipment 50. This is due, in part, to the use of electronics and modularization in major power supply equipment components. One such component is the CPS4000 available from Lucent Technologies, indicated by reference 120. CPS4000 represents a family of power modules which may be incorporated in the same device 120. CPS4000 receives AC power input 92 and generates the necessary DC voltage to supply up to eight carrier multiplexers 52,72. Power supply equipment 70 also includes battery tray 122 to support power supply equipment 70 in the event of loss of AC power input 92. Alarm cross-connect panel 124 terminates alarms received by power supply equipment 70. Components 120, 122, 124 within power supply equipment 70 are interconnected by power equipment cabling 126 as is known in the art.

Connections to power supply equipment 70 are made through one or more power harnesses, shown generally by 128. Power harness 128 is terminated at 50-pin 710 module 130. Module 130 is wired to present the same necessary connections provided by module 106 connected to old power supply equipment 50. Alarm signals 108 occupy pairs two through five in module 130. Ringing voltage 114 is supplied by pair 12. DC voltage and ground 112 still appear at pairs seven through eleven and fifteen through eighteen. However, only one connection of each type 54a, 54b runs from power supply equipment 70 to module 130 at pair eighteen. The remaining pairs seven through eleven and fifteen through seventeen are connected by bridges 76a, 76b. Up to eight modules 130 can be connected to power supply equipment 70 containing CPS4000 rectifier device 120.

A method for replacing power supply equipment 50 with power supply equipment 70 that will create a minimal interruption of services to customer premises 24 will now be described. The order of steps taken in the process may be varied considerably and some of the work may be done ahead of time, away from field cabinet 26.

Preferably, central office 22 is notified prior to opening field cabinet 26 as various alarms will invariably be tripped during the replacement process. Batteries and battery tray 96 are removed from power supply equipment 50. Rectifier 94 may also be removed from cabinet 26 without breaking any connections to create more working space within cabinet 26. The CPS4000 and new battery trays 122 are placed into cabinet 26. Cabling 126 connecting battery tray 122 with CPS4000 is installed. AC power input 92 is connected to CPS4000. Each 710 module 106 supporting an existing carrier multiplexer 52 designated to remain within cabinet 26 is individually replaced. A corresponding module 130 is wired. Alarm connections 108 are made between module 130 and alarm cross-connect panel 124 using 24-gauge four-pair inside wire or equivalent.

A 22-gauge insulated solid copper wires is connected to each connector of pair fourteen in module 130 for ringing voltages 114. The other ends of the ringing wires can be connected to a ringing wiring harness, such as is available in universal power kit K17006A-V01B from Lucent Technologies. The CPS4000 supports four ringing pairs. If more than four carrier multiplexers 52,72 are installed in field cabinet 26, up to eight ringing pairs can be formed by doubling ringing pair wires on connector pins in connectors between module 130 or carrier multiplexers 72 and CPS4000.

Bridges 76 are constructed in module 130 using 22-gauge insulated solid copper wire. Bridging connections are made between pins in module 130 as shown in FIG. 5. A −48V wire and a RGRD wire run from module 130 and are spliced into a two-conductor power cable which plugs into CPS4000.

Once module 130 is completely wired, a new mating male 710 module can be constructed by cutting each wire from the male 710 module connected to module 106 and inserting the cut wire into the mating male 710 module for new female module 130. No loss of power should be experienced by carrier multiplexer 52 due charge held by capacitors within carrier multiplexer 52. Once all wires from carrier multiplexer 52 have been transferred, module 130 is capped.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of replacing telecommunications carrier equipment in a field cabinet comprising:
    removing a first set of power supply equipment supporting at least one carrier multiplexer, each carrier multiplexer having a plurality of power connections for each of a plurality of power types, the first set of power supply equipment having a supply connection for each of the plurality of power connections at each of the plurality of power types;
    bridging together all of the plurality of power connections of each power type for each of the at least one carrier multiplexer;
    installing a second set of power supply equipment having a single supply connection corresponding to each power type for each carrier multiplexer; and
    connecting each of the bridged plurality of power inputs for each of the at least one carrier multiplexer with the corresponding supply connection for each power type.

2. A method of replacing telecommunications carrier equipment in a field cabinet as in claim 1 further comprising notifying a central office of possible power related alarms prior to disconnecting and removing the first set of power supply equipment.

3. A method of replacing telecommunications carrier equipment in a field cabinet as in claim 1 further comprising:
    installing at least one new carrier multiplexer, each new carrier multiplexer having at least one power input corresponding to each of the plurality of power types; and
    for each new carrier multiplexer, connecting the at least one power input for each power type on the new carrier multiplexer with a corresponding power supply connection on the second set of power supply equipment.

4. A method of replacing telecommunications carrier equipment in a field cabinet as in claim 3 further comprising:
    connecting at least one high-bandwidth cable to a central office side of each new carrier multiplexer; and
    connecting a plurality of carrier loops to a customer premises side of each new carrier multiplexer.

5. A method of replacing telecommunications carrier equipment in a field cabinet as in claim 3 wherein the new carrier multiplexer is a digital carrier system.

6. A method of replacing telecommunications carrier equipment in a field cabinet as in claim 5 wherein the new carrier multiplexer is an NEC-ISC-303.

7. A method of replacing telecommunications carrier equipment in a field cabinet as in claim 1 wherein the second set of power supply equipment comprises a Lucent CPS-4000.

8. A method of replacing telecommunications carrier equipment in a field cabinet as in claim 1 wherein at least one carrier multiplexer is an SLC-96.

9. A method of replacing telecommunications carrier equipment in a field cabinet as in claim 1 wherein the plurality of power types comprises −48VDC and ground return.

10. A method of replacing telecommunications carrier equipment in a field cabinet as in claim 1 wherein the plurality of power types comprises positive ringing AC and negative ringing AC.

11. A remote terminal cabinet comprising:
    a housing located outside of a telecommunications central office, equipment housed within the housing connected to the central office through a plurality of high-bandwidth cables, equipment housed within the housing connected to a plurality of customer premises through a plurality of carrier loops;
    a plurality of carrier multiplexers disposed within the housing, each carrier multiplexer multiplexing at least one of the high bandwidth cables to a plurality of the customer premises carrier loops, at least one of the carrier multiplexers having a plurality of power connections for each of a plurality of power types;
    a power supply disposed within the housing, the power supply having a power supply connection for each power type on each carrier multiplexer; and
    a plurality of bridging connections disposed within the housing, each bridging connection connecting a plurality of power connections for one power type on one of the at least one carrier multiplexers with a corresponding power supply connection on the power supply.

12. A remote terminal cabinet as in claim 11 wherein at least one of the carrier multiplexers comprises an SLC-96.

13. A remote terminal cabinet as in claim 11 wherein at least one of the carrier multiplexers comprises an NEC-ISC-303.

14. A remote terminal cabinet as in claim 11 wherein the power supply comprises a Lucent CPS-4000.

15. A remote terminal cabinet as in claim 11 wherein the plurality of power types comprises −48VDC and ground return.

16. A remote terminal cabinet as in claim 11 wherein the plurality of power types comprises positive ringing AC and negative ringing AC.

* * * * *